May 20, 1969  J. N. GROVES  3,445,321
THIN, REINFORCED PERMSELECTIVE FILMS
Filed May 1, 1967

Inventor:
James N. Groves,
by Leo J. Martini
His Attorney 3,445,321
THIN, REINFORCED PERMSELECTIVE FILMS
James N. Groves, Schenectady, N.Y., assignor to General
Electric Company, a corporation of New York
Filed May 1, 1967, Ser. No. 635,176
Int. Cl. B01d 46/54, 46/00
U.S. Cl. 161—92                           2 Claims

ABSTRACT OF THE DISCLOSURE

A thin, high strength, reinforced, hole-free elastomer membrane having reinforcing fibers covered with a substantially uniform coating of the elastomeric material and the preparation of such membranes is described. The diameter of reinforcing fibers are such that web portions are formed giving a waffle-like configuration to the reinforced membrane.

Background of the invention

This invention is concerned with thin permselective films. Such films are of particular interest because of the capacity of such films for separating certain gases from mixtures of the latter and other gases. Thus, for example, the utilization of thin, non-porous silicone rubber membrane material for the separation of gases is disclosed in U.S. Patent 2,966,235—Kammermeyer, issued Dec. 27, 1960, and in U.S. Patent 3,274,750—Robb, issued Sept. 27, 1966. Hereinafter, when reference is made to "gas" or "gases," this term is intended to include vapors.

The manner in which such membranes function to accomplish the permeation phenomenon is such that the thinner the membrane, the more efficient the gas separation. However, having the membrane free from perforations is a rigid requirement, because the permeation of gas through the membrane is not the simple diffusion process such as occurs in the passage of gases through porous materials. Rather, the gas dissolves in the membrane material on the side of the membrane having a high partial pressure in that particular gas. The gas then diffuses through the membrane and comes out of solution on the side of the membrane having a low partial pressure in that gas. Therefore, because of this dual transfer mechanism involving both solution and diffusion, the conduct, or permeability, of the gas through the membrane is a product of (a) its diffusion coefficient in and (b) its solubility in the membrane material.

The amount of gas that can permeate through a membrane of a given area in a given time is dependent upon the thickness of the membrane in addition to other factors, such as the pressure drop across the membrane. It may, therefore, be seen that optimum gas separation for a given membrane material is obtained, when the thinnest possible membrane prepared therefrom, which is free of perforations, is employed.

Silicone rubber compositions, for example, can be calendered to produce films ranging in thickness from about 2 to about 10 mils. However, in order to produce sound, uniformly-thick silicone rubber membranes of thicknesses of less than about 2 mils more sophisticated processes, such as the process disclosed in U.S. Patent application Ser. No. 466,698—Robb (now U.S. Patent 3,325,330), filed June 24, 1965, and assigned to the assignee of the instant application must be employed.

Summary of the invention

High strength, hole-free integrally reinforced membranes having thicknesses ranging from about 0.25 to about 10 mils have been prepared by solvent-casting the membrane on a clean, heavy liquid surface immiscible with and more dense than the polymer solution from which the membrane is cast, the appropriate reinforcing medium having been previously floated in stretched condition over the casting surface.

Once the solvent has been expelled from the polymer solution, as by evaporation at room temperature or by the further application of heat thereto and after the resulting deposited polymer membrane floating on the liquid casting surface has been sufficiently cured in situ by conventional techniques applicable to the particular membrane material, the membrane with the reinforcement integrated therein can be removed for final curing, if required, or, if further curing is not required, for use.

Certain requisite process conditions determine the nature of the supporting liquid/membrane elastomer/reinforcement system. These conditions are as follows:

(1) The supporting liquid should be heavy (specific gravity of at least about 9.0 to provide buoyancy for the membrane system to be cast thereon and to be readily self-leveling;

(2) The supporting liquid surface should be smooth, readily cleaned, and uniform in its nucleation properties for the formation of the deposited membrane;

(3) The supporting liquid surface should not wet the membrane film during the solvent casting process or adhere thereto during or after membrane formation;

(4) The supporting liquid and the membrane elastomer in dilute solution should be completely immiscible;

(5) Solvent explusion from the membrane elastomer must occur without the formation of discrete bubbles (this requirement is greatly facilitated by thin layer casting);

(6) The membrane material should be readily susceptible to curing to permit fairly rapid removal thereof from the liquid supporting surface;

(7) The membrane elastomer solution should wet the reinforcing fibers, while the reinforcing fibers must not be wet by the supporting liquid, so as to facilitate even spreading of the elastomer solution in a thin layer over the entire surface of the casting area contained and;

(8) the membrane elastomer should adhere to the reinforcing fibers forming a substantially uniformly thick containment for the individual fibers as the solvent evaporates and deposits the film completely integrating the reinforcement and elastomer.

Curing of the elastomer may be effected by any of the conventional techniques, as for example, heating, irradiation, ultraviolet light and various curing agents specific to the particular elastomer being used. Treating the reinforcement medium with well-known priming materials can enhance the non-wetting relationship between the reinforcing fibers and the casting liquid or enhance wetting of these fibers by the elastomer.

As will be evident herein the process of this invention is relatively tolerant of environmental conditions and is susceptible of automation to a considerable degree.

Brief description of drawings

The exact nature of this invention as well as objects and advantages thereof will be readily apparent from consideration of the following specification relating to the annexed drawing in which.

Description of the preferred embodiment

In the preferred embodiment the pool of casting liquid is clean mercury and the membrane elastomer is dimethylsiloxane. The membrane is cast integrally with a reinforcing mesh, or net, made of a material, such as Dacron, nylon or glass fiber.

Figure 1:
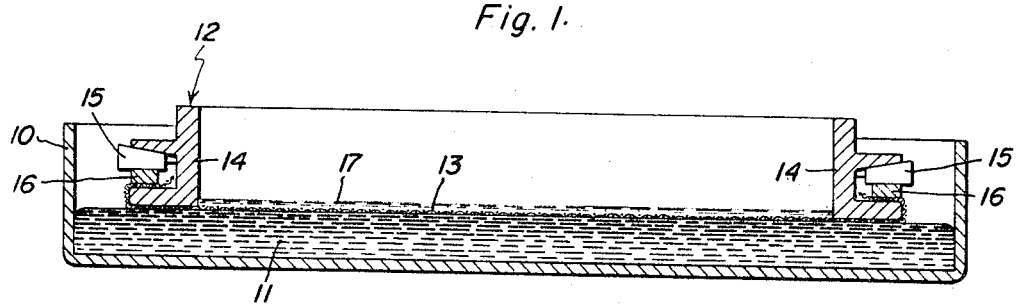
FIG. 1 is a schematic view in cross-section of an embodiment of this invention specifically for casting reinforced membranes.

As shown in FIG. 1 vessel 10 contains a pool 11 of mercury, which serves as the self-leveling support liquid. Supported on the surface of the mercury is frame 12. Reinforcing mesh 13 stretched across the span between the sides 14 of frame 12 is held in position by wedges 15 and strips 16 coacting with frame 12 floats on the surface of the mercury pool 11. Neither the net 13 nor the frame 12 are wetted by the mercury and although net 13 lies in intimate contact with the surface of the mercury, it is not immersed therein. The dimethylsiloxane dissolved in an appropriate solvent (as for example, toluene) to a self-leveling consistency, is poured as layer 17 over the exposed mercury and net surfaces within the confines of the floating stretch-frame 12 with sides 14 serving to define limits for the membrane being cast.

The solvent may either be allowed to evaporate at room temperature from the dimethylsiloxane solution or else the solvent may be carefully expelled from layer 17 by the gentle application of heat leaving behind the deposited integrated polydimethylsiloxane membrane-nylon net construction 20.

Although dimethylsiloxane has been used by way of illustration, other silicone rubbers are also preferred film materials. The term "silicone rubber" is intended to include both filled and unfilled organopolysiloxanes which are convertible to the cured, solid, elastic state by any of the means available in the art, for instance, by heating at elevated temperatures in the presence of cure accelerators such as organic peroxides, etc., by irradiation with high energy electrons as is more particularly disclosed in U.S. Patent 2,763,609, issued Sept. 18, 1956, etc.

Other permeable film materials such as cellulosic ethers and esters described in U.S. Patent 3,283,042—Loeb et al., may be cast by this method as well as polystyrene, polycarbonate, polyvinyl chloride, vinylidene chloride, etc. so long as a casting liquid and reinforcing fiber material are selected in accordance with the criteria set forth above.

In place of mercury numerous low melting alloys may be used to advantage in the liquid state as the heated condition of these fused alloys will help to gently evaporate the solvent and, where applicable, to cure the elastomer film. Among the alloys suitable are those having a melting point of less than about 100° C. some of which are listed in the Handbook of Chemistry—Lange, seventh edition (Handbook Publishers, Inc. 1949) in the "Melting Point and Composition of Fusible Alloys" table on p. 815. All of these alloys have a specific gravity greater than about 9.0. For example:

Alloy 1 (Melting Point about 47° C.)[1]

| | Percent |
|---|---|
| Indium | 18.1 |
| Bismuth | 41.0 |
| Lead | 22.1 |
| Tin | 10.6 |
| Cadmium | 8.2 |
| | 100.0 |

[1] Has a specific gravity of about 9.2.

Alloy 2 (Melting Point about 66° C.)[1]

| | Percent |
|---|---|
| Bismuth | 50.0 |
| Lead | 25.0 |
| Tin | 12.5 |
| Cadmium | 12.5 |
| | 100.0 |

[1] Has a specific gravity of about 9.7.

Alloy 3 (Melting Point about 70° C.)[1]

| | Percent |
|---|---|
| Bismuth | 50.0 |
| Lead | 27.0 |
| Tin | 13.0 |
| Cadmium | 10.0 |
| | 100.0 |

[1] Has a specific gravity of about 9.6.

If the integrated construction 20 is not already sufficiently cured by contact with the moisture in the or because of the heat applied to evaporate the solvent, additional heat or radiation may be applied thereto to bring about that requisite degree of curing to provide sufficient integrity in the integrated membrane-net construction 20 to enable lifting thereof from the mercury surface.

Once removed from the surface of the casting liquid surface, continued curing of the polydimethyl siloxane may be readily accomplished. The depth to which the elastomer solution 17 is poured within frame 12 depends upon the concentration of dimethylsiloxane in solution and the desired thickness of the completed membrane web 21. Both the depth of pour and the concentration can be varied to control membrane thickness. The resulting thickness of membrane web 21 spanning between nylon filaments 22 is inherently uniform, since the solution is homogeneous and the entire system is self-leveling.

Mercury is an ideal casting liquid, because the surface thereof can be easily cleaned to present a highly uniform nucleating surface of extreme smoothness. In fact, the surface of the mercury becomes increasingly clean as successive membranes are cast thereon.

In the process of this invention, the membrane grows by deposition from the membrane elastomer solution 17 as the solvent evaporates. Each unit area of membrane web 21 has the same amount of elastomer solution 17 above it at all times during the deposition process thereby inherently resulting in uniform thickness of film web 21. Should it be impossible or impractical to eliminate all large impurity particles from the system, such particles simply become sealed into the membrane during its formation and do not create holes. In other processes for the preparation of films, such as calendering, the presence of such large particles have been known to be responsible for the creation of holes.

Further, tearing of the membrane is minimized because of the ease of release of the integrated membrane-net construction from the mercury surface.

Figure 2:
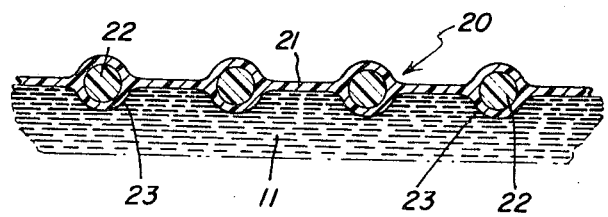
FIG. 2 is an enlarged cross-section showing both the manner in which the reinforcement becomes incorporated in the polymer and the provision of support by the casting liquid in the membrane areas between the reinforcing fibers. For the sake of clarity reinforcing fibers have been shown extending in only one direction although the invention is not so limited.

As may be seen in FIG. 2, the non-wetting mercury forms a convex surface in any given mesh area (between fibers of the net) with a sharp angle meniscus 23 occurring at the point of contact with the fibers 22 of net 13. Each meniscus 23 facilitates coating of the underside of each net fiber 22 with the membrane elastomer as the upper surface thereof becomes coated meanwhile maintaining requisite membrane thinness in the mesh area producing a waffle-like configuration for the composite, when two-way reinsforcement is employed. As a result of having the membrane elastomer completely and uniformly coat the net fibers, the reinforcing net itself is rendered stronger and more tear-resistant than the net alone (without the elastomer coating).

An important aspect of the system is that the net 13 seems almost always to come into intimate contact without wetting, with the surface of mercury pool 11 in regions wherein there are minor variations in the level of the net. However, even when slight discrepancies in height occur relative to the casting surface (as in the case of woven fibers) warpage in the membrane as it conforms during its deposition does not effect the performance thereof. For this reason uniform stretching of the net is not a requisite.

By the use of the disclosed apparatus and method reinforced hole-free membranes, which have a film thickness in the web regions thereof of less than about 1 mil and which have the desired permeability characteristics have been consistently produced.

The hole-free nature of reinforced membrane 20 has been established by microscopic examination and, as well, by subjecting the completed membrane to pressurization to check for leaks.

The requisite thinness of the elastomer solution should easily be discernible to the eye, but for the sake of definiteness it may be stated that the viscosity of the elastomer solution should not exceed about 250 centipoises at 20° C.

Reinforcing strands and nets may be prepared from any material possessing high tensile strength and being capable of formation into thin sound filaments. Although the more likely materials have been indicated as Dacron, nylon and glass fiber, it is conceivable that metallic filaments may also be employed. The strand diameter selected should be considered in terms of the thickness of membrane web desired. Thus, the diameter of the reinforcing strands employed should not exceed about five times the membrane web thickness for relatively large mesh sizes, and when the mesh size is quite small (close spacing between reinforcing strands) the strand diameter should be reduced, as well.

The completed fully-cured reinforced membrane with its reinforcement substantially symmetrically disposed relative to the thickness of each web portion spanning from any given reinforcing fiber to the reinforcing fibers adjacent thereto achieves both reduced effective membrane thickness and increased overall membrane strength. Thus, a membrane requiring less delicate handling and yet permitting the permeation of greater amounts of gas therethrough in a given time for a given pressure differential is produced. Such an increase in efficiency, of course, further reduces the required area (and, therefore, bulk) of membrane required to satisfy a given set of design conditions.

Modifications and variations of this invention as set forth herein in the description of the preferred embodiment are easily conceived applying the general guidelines offered in the specification. It is, therefore, to be understood that within the scope of the appended claims, this invention may be practiced otherwise than as specifically described.

What I claim as new and desire to secure by Letters Patent of the United States is:

1. A flexible cured non-porous reinforced elastomer membrane consisting of a plurality of elastomer web portions each having a substantially uniform thickness of less than about 2 mils interconnected by oriented flexible reinforcing fibers covered with a substantially uniform coating of the same elastomer formed integral with said web portions, the diameter of said fibers being less than about five times the thickness of said web portions but being a value greater than said web portions to give a waffle-like configuration to said reinforced membrane.

2. The cured, non-porous reinforced elastomer membrane substantially as recited in claim 1 wherein the elastomer is polydimethylsiloxane and the reinforcing fibers are nylon.

References Cited

UNITED STATES PATENTS

| | | | |
|---|---|---|---|
| 1,945,933 | 2/1934 | Chilowsky et al. | 264—298 |
| 2,760,233 | 8/1956 | Bjorksten | 264—298 |
| 2,836,529 | 5/1958 | Morris | 161—92 |
| 3,047,442 | 7/1962 | Bozzacco | 161—193 |
| 3,158,528 | 11/1964 | Brown | 161—208 |
| 3,250,080 | 5/1966 | Garwin | 55—16 |

REUBEN FRIEDMAN, *Primary Examiner.*

CHARLES N. HART, *Assistant Examiner.*

U.S. Cl. X.R.

55—158; 161—95, 133, 160, 205; 264—255, 298